United States Patent
Butts, Jr.

(10) Patent No.: US 6,683,923 B1
(45) Date of Patent: Jan. 27, 2004

(54) METHOD AND APPARATUS FOR DETECTING AND TRACKING CODED SIGNALS IN A NOISY BACKGROUND ENVIRONMENT

(75) Inventor: J. James Butts, Jr., Rancho Palos Verdes, CA (US)

(73) Assignee: bd Systems, Inc., Torrance, CA (US)

( * ) Notice: Subject to any disclaimer, the term of this patent is extended or adjusted under 35 U.S.C. 154(b) by 0 days.

(21) Appl. No.: 09/293,137

(22) Filed: Apr. 16, 1999

(51) Int. Cl.⁷ .............................................. H04L 27/06
(52) U.S. Cl. ...................................... 375/343; 375/150
(58) Field of Search ................................. 375/130, 140, 375/141, 142, 143, 147, 148, 149, 150, 152, 343, 367, 371; 370/203, 208, 209, 320, 335, 342, 441, 479, 515; 701/200–226; 708/422, 423, 424, 425, 426, 813; 455/1; 342/352, 450, 457, 464

(56) References Cited

U.S. PATENT DOCUMENTS

| | | | |
|---|---|---|---|
| 4,821,294 A | * 4/1989 | Thomas et al. ............. | 375/343 |
| 5,245,628 A | 9/1993 | LaPadula, III et al. ..... | 375/148 |
| 5,285,472 A | 2/1994 | Leonard et al. ............. | 375/150 |
| 5,347,284 A | 9/1994 | Volpi et al. ................. | 342/356 |
| 5,535,237 A | 7/1996 | LaPadula, III et al. ..... | 375/130 |
| 5,598,429 A | 1/1997 | Marshall ..................... | 375/149 |
| 5,644,592 A | 7/1997 | Divsalar et al. ............ | 375/147 |
| 5,897,605 A | * 4/1999 | Kohli et al. ................ | 701/213 |
| 5,943,363 A | * 8/1999 | Hanson et al. ............. | 375/150 |
| 6,005,889 A | * 12/1999 | Chung et al. ............... | 375/140 |

* cited by examiner

Primary Examiner—Chieh M. Fan
(74) Attorney, Agent, or Firm—Chan Law Group LC; Brett L. Halperin

(57) ABSTRACT

A method and apparatus for detecting and tracking a coded signal within a noisy background environment, wherein the signal is correlated over subintervals of time both in-phase and in quadrature, stored indices which represent all possible paths of the signal phase are retrieved, in-phase and quadrature sums are formed wherein the first term of the in-phase sum is the in-phase correlated signal over the first time subinterval and the first term of the quadrature sum is the quadrature correlated signal over the first time subinterval and wherein successive terms are correlated signals from successive time subintervals which are selected based upon the value of the retrieved index, and the true phase path of the signal is estimated by determining the correlation sum having the maximum absolute value.

22 Claims, 7 Drawing Sheets

FIG. −1

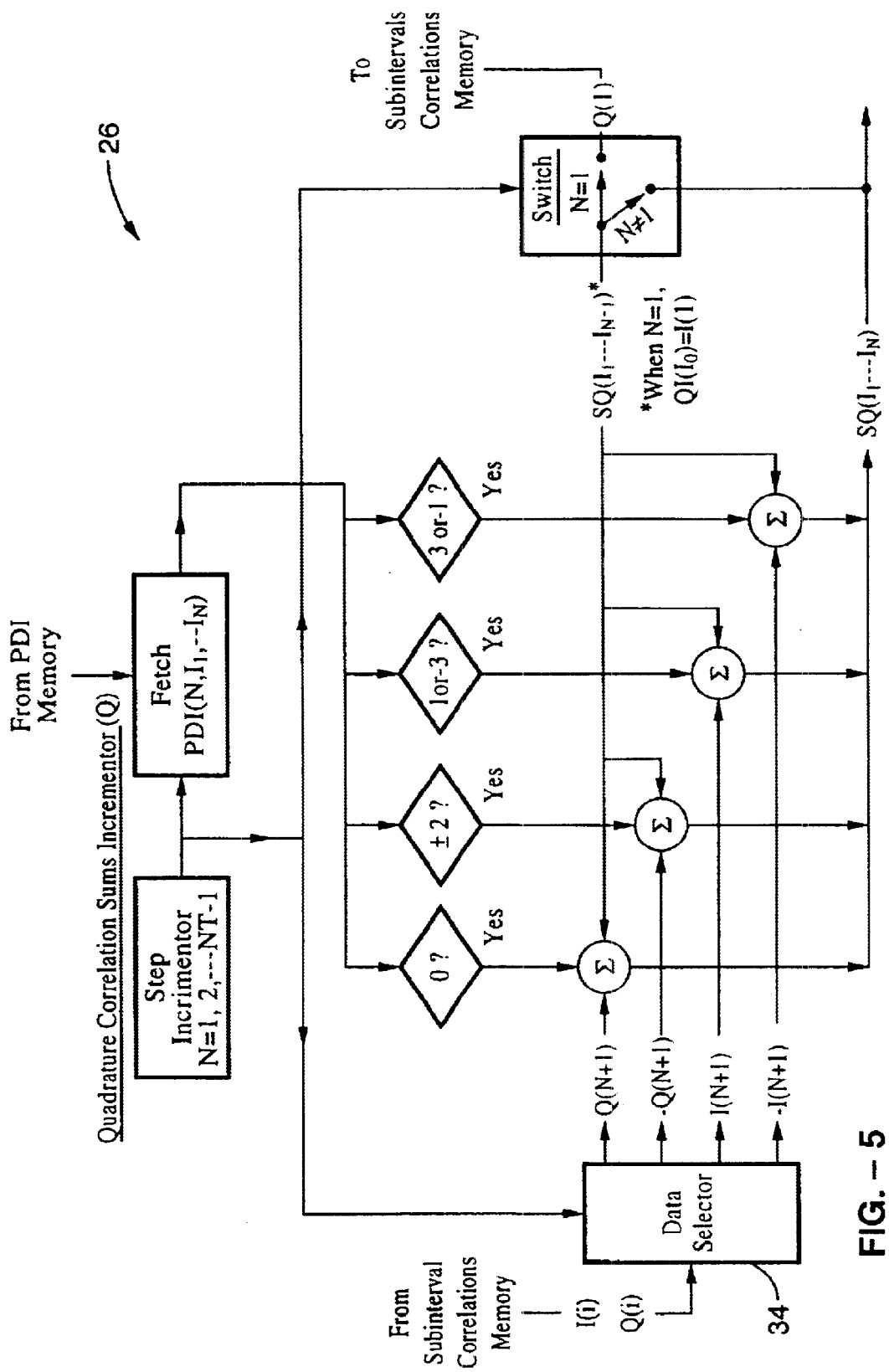
FIG. − 5

METHOD AND APPARATUS FOR DETECTING AND TRACKING CODED SIGNALS IN A NOISY BACKGROUND ENVIRONMENT

All electronic communications systems suffer from the problem of background noise, regardless of whether the communication signals are analog or digital. It has always been the objective to improve the signal-to-noise (S/N) ratio in electronic communication systems, as background noise makes it more difficult to detect and/or distinguish the communication signal. If the background noise level is so strong that it obscures the transmitted signal, the receiver unit will not be able to detect the signal.

Known techniques for improving S/N ratio have included increasing the power of the transmitted signal, increasing the sensitivity of the receiver unit and using specially designed antennas, however, the capabilities of these techniques are limited. For example, there are situations where the transmitted signal power must be maintained at a relatively low level due to weight and/or power design constraints on the transmitter unit. Additionally, the design of the receiver unit, may be limited by size, weight and/or cost. These design constraints restrict application of higher sensitivity components in the receiver unit. Furthermore, the distance between the transmitter and receiver units may be so great so as to cause a significant degradation of the signal strength, regardless of the capabilities of either the transmitter or receiver units. Moreover, velocity changes between the transmitter and receiver units would also adversely affect the S/N ratio.

This is especially the case with the Navstar Global Positioning System (GPS) where the receiver unit is usually in motion while receiving signals from the satellite transmitters in orbit above the earth. Often, transmitted signals from GPS satellites undergo phase changes at the receiver unit due to unknown relative velocity changes as a result of unmeasured receiver unit accelerations and also as a result of phase-perturbing effects of the intervening ionosphere. In order to differentiate the transmitted signal from the noise, GPS satellites and receivers employ spread spectrum technology, wherein the phase of the transmitted signal is modulated digitally with a Pseudo-Random Noise Code. Thus, using correlation techniques, the receiver can detect and track the signal by matching the spread spectrum signal emanating from the satellite with an image of the signal generated in the receiver.

Such correlation techniques, however, are ineffective when the phase of the signal to be detected is changing in an unpredictable way during the period of time over which the detecting and tracking process occurs (integration time). The unpredictable phase may be due to any or a combination of several causes, including a variation caused by a changing propagation delay in the intervening medium between the transmitter and receiver. Unknown phase movement of the signal spoils the coherence between the locally generated template and the incoming signal and often limits processing gain. The output of the correlation procedure is typically proportional to cos ($\Delta\theta$), wherein $\Delta\theta$ is the phase error between the locally generated template and the incoming signal. For instance, a 60° error reduces the correlation by 50%, and a 90° error reduces the correlation to zero. Thus, the phase coherence must be maintained to approximately one-radian during the integration time interval, thereby leading to an upper limit on the coherent integration time which depends on signal phase predictability. If, for example, the uncertainty in relative velocity between the satellite transmitter and receiver unit is $\Delta V$, then the maximum integration time is $c/(2\pi f \Delta V)$ where c is the speed of light and f is the carrier frequency. In the GPS for example, where the frequency of one of the carrier signals is $1.57\times10^9$ Hz and $\Delta V$ is 1 m/sec, the integration time limit is 30 milliseconds (ms). Therefore, it can be seen that at higher frequencies, the integration time limit becomes more stringent, and therefore becomes a severe limitation in dynamic applications on moving vehicles where the velocity may be changing rapidly.

Thus, there is a need for enhancing the detection and tracking of transmitted signals or coded signals within a noisy background environment, whereby the effective coherent integration time is extended beyond what would otherwise be possible because of a lack of signal phase predictability. The present invention satisfies these needs, as well as others, and generally overcomes the deficiencies found in the background art.

BRIEF SUMMARY OF THE INVENTION

The present invention is a method and apparatus for detecting and tracking coded transmitted signals in a noisy background environment. The method of the present invention, generally comprises the steps of correlating a signal in-phase and in-quadrature over subintervals of time and assigning a value to each in-phase and quadrature correlated signal for each time subinterval; storing the in-phase and the quadrature correlated signal values into a first memory; retrieving previously stored data representing path phase displacement indices from a second memory; forming in-phase correlation sums and quadrature correlation sums of the in-phase and quadrature correlated signal values, respectively; and estimating the true phase path of the signal by determining the correlation sums having the maximum absolute value.

The apparatus of the present invention generally comprises a correlator means, a first memory means, a second memory means, a correlation sums incrementor means and an estimating means.

The correlator means performs an in-phase and quadrature correlation of a transmitted signal over subintervals of time and generates a value for each time subinterval representing the in-phase correlation component and a value representing the quadrature correlation component. These in-phase correlation values and quadrature correlation values are stored in the first memory means, which is coupled to the correlator means. The second memory means stores indices that represent all possible phase paths for the transmitted signal. The correlation sums incrementor means is coupled to both the first memory means and the second memory means and forms sums of the in-phase correlated signal values and the quadrature correlated signal values over the total number of time subintervals received from the correlator means.

The estimating means is coupled to both the correlation sums incrementor and the second memory means and determines the true phase path of the signal using the indices from the second memory means and the correlation sums having the maximum absolute value.

A means for generating the indices that represent all possible phase paths for a signal is coupled to a second memory.

An object of the invention is to provide an apparatus for detecting and tracking coded signals in a noisy background environment.

Another object of the invention is to provide an apparatus for detecting and tracking coded signals in a high jamming environment.

Still another object of the invention is to provide an apparatus for detecting and tracking weak coded signals or low bandwidth communications signals.

Still another object of the invention is to provide an apparatus which extends the effective coherent integration time beyond what would be otherwise possible because of a lack of signal phase predictability.

Still another object of the invention is to provide a method for detecting and tracking coded signals in a noisy background environment.

Still another object of the invention is to provide a method for detecting and tracking coded signals in a high jamming environment.

Still another object of the invention is to provide a method for detecting and tracking weak coded signals or low bandwidth communication signals.

Still another object of the invention is to provide a method for extending the effective coherent integration time beyond what would be otherwise possible because of a lack of signal phase predictability.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 5 is a functional flow diagram of a quadrature correlation sums incrementor shown in FIG. 1.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts without departing from the basic concepts as disclosed herein.

Figure 1:
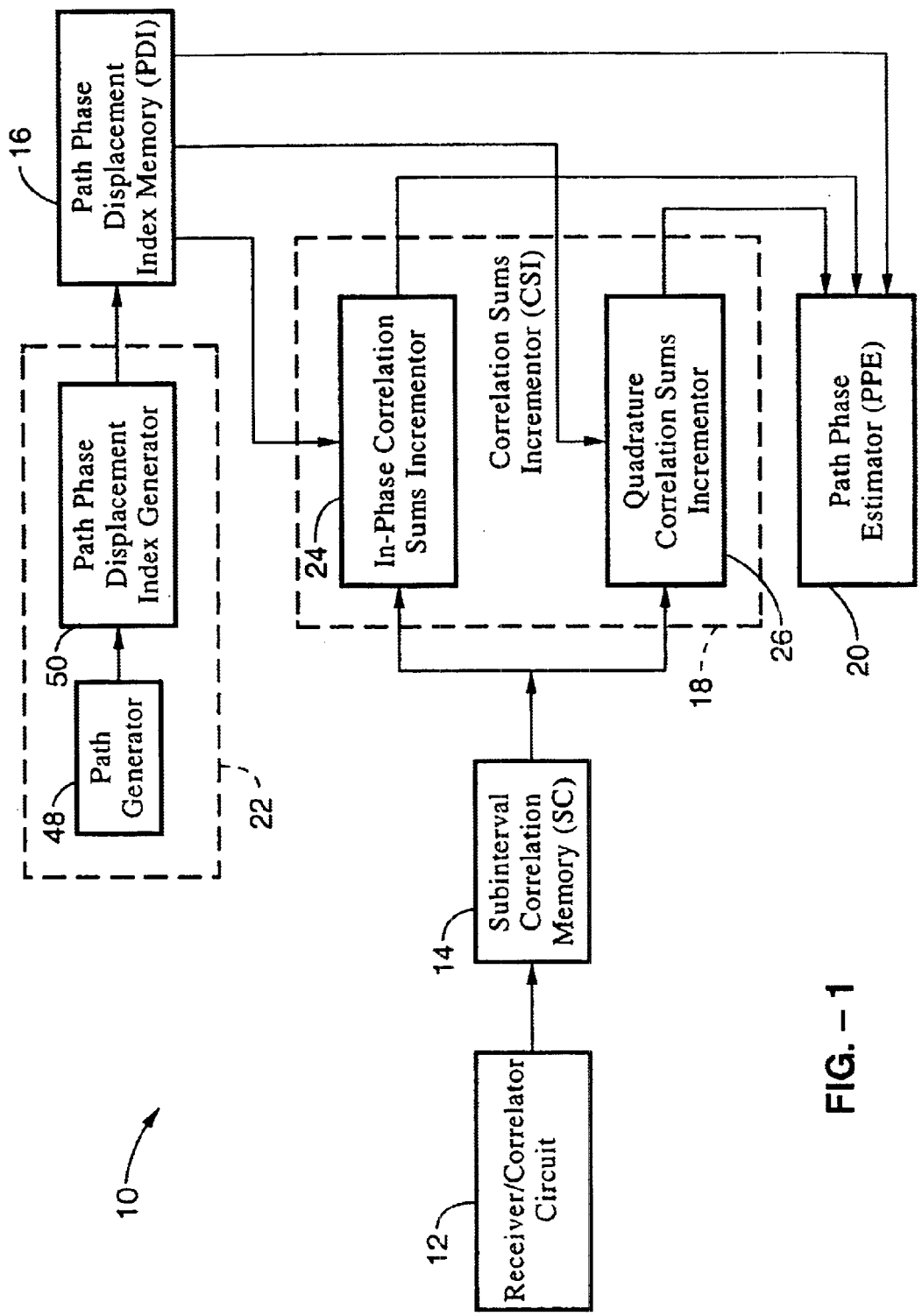
FIG. 1 is a functional block diagram generally showing the apparatus of the present invention.

Referring first to FIG. 1, an apparatus 10 for detecting and tracking coded signals in a noisy background environment, in accordance with the present invention, is generally shown. Apparatus 10 comprises a receiver/correlator 12, a time subinterval correlation (SC) memory 14, a path phase displacement index (PDI) memory 16, a correlation sums incrementor (CSI) 18 and a path phase estimator (PPE) 20. As an option, apparatus 10 may also comprise a means 22 for generating indices that represent all possible phase paths for a given signal.

Figure 2:
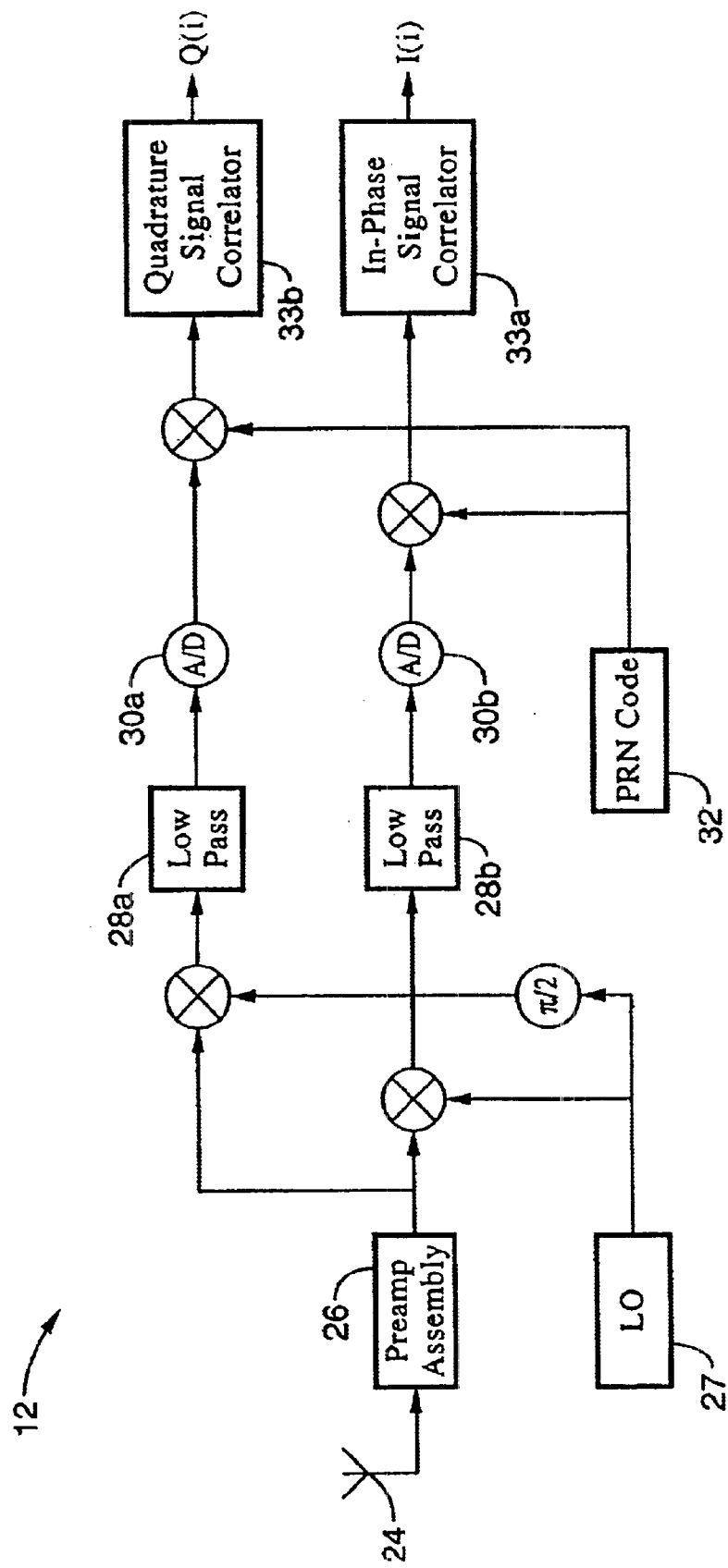
FIG. 2 is a functional block diagram for a receiver/correlator circuit of the present invention.

Referring also to FIG. 2, receiver/correlator 12 performs a primary function of correlating a received signal both in phase and in quadrature over a number of time subintervals and assigning a value to each in-phase correlated signal (I) and to each quadrature correlated signal (Q), for a given subinterval of time. As disclosed in the present invention, receiver/correlator 12 also performs the function of receiving a signal that is transmitted from a remote site, such as a GPS satellite (not shown). Although receiver/correlator 12 is depicted a single unit capable of performing both aforementioned functions, the functions of signal receiver and signal correlator may also be implemented independently using separate units. Moreover, the invention as described herein is applicable not only to GPS systems, but also to signal processing systems in general.

The receiver function of receiver/correlator 12 is similar to those known in the art and thus will not be discussed in great detail. Receiver/correlator 12 utilizes antenna 24 to capture the signal, which is fed into a preamp assembly 26. The signal is mixed with a signal from a local oscillator 27 and another signal from local oscillator 27 that is shifted 90°, thereby creating an in-phase and quadrature signals. Both the in-phase and quadrature signals pass through low pass filters 28a and 28b, respectively and then through A/D converters 30a and 30b, respectively. The signals from A/D converters 30a and 30b are multiplied with a Pseudo Random Noise (PRN) code 32, which has a known and/or expected correlation code sequence, and then integrated by an in-phase signal correlator 33a and a quadrature signal correlator 33b, as described below.

Figure 3:
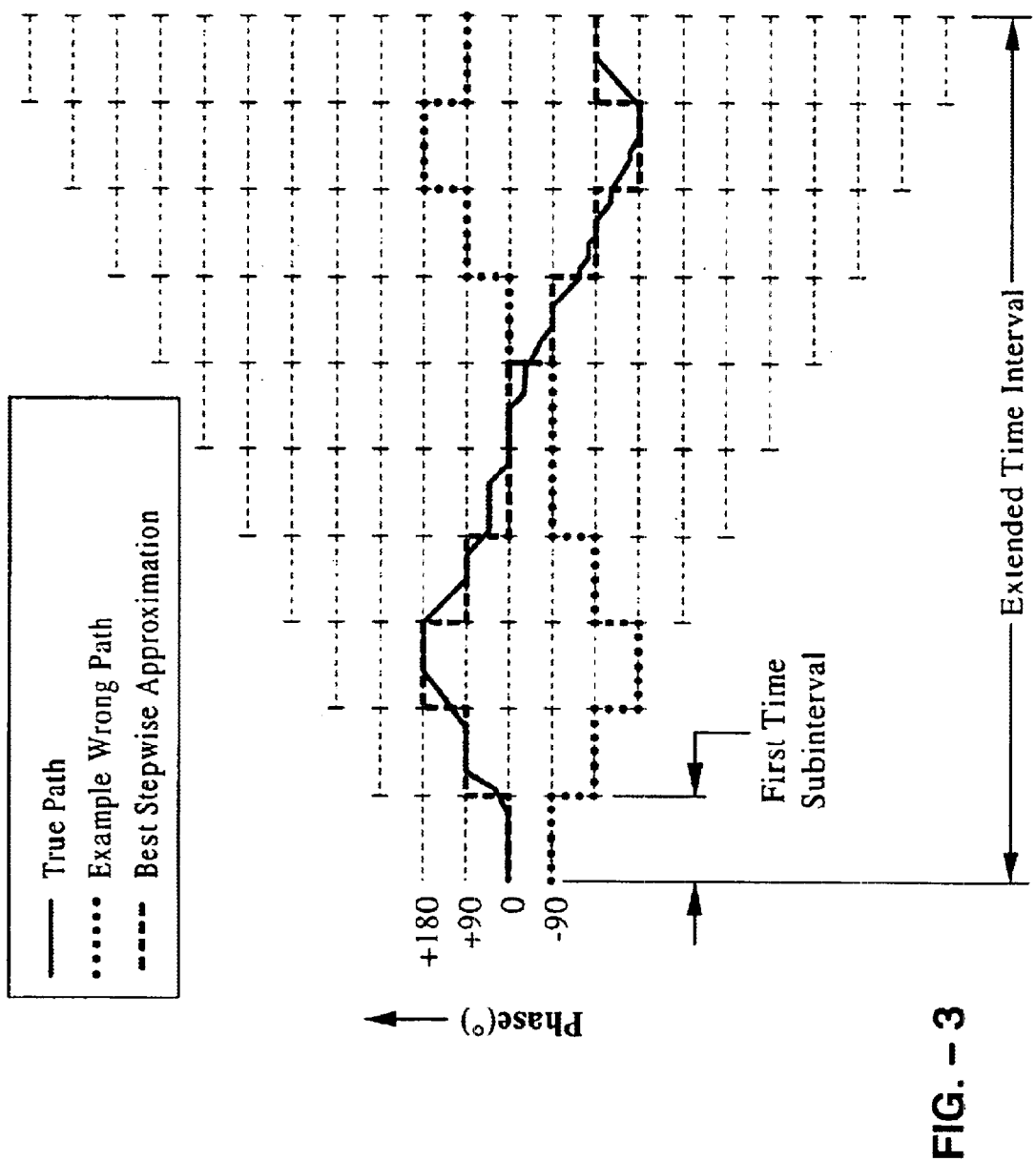
FIG. 3 is a matrix of all possible paths for a given signal starting at a phase of 0° and having ten time subintervals and a stepwise approximation of the given signal.

Referring also to FIG. 3, receiver/correlator 12 correlates the received signal over subintervals of time, wherein the unknown signal phase movement is small. These correlations are accomplished both in-phase and in quadrature to obtain both the in-phase and quadrature components of the signal. For example, at 0° phase angle, I=C(0); at +90° phase angle, Q=C(+90); at 180° phase angle, C(180)=−C(0)=−I; and at 270° phase angle, C(270)=−C(+90)=−Q. Thus, it can be seen that correlations at phase displacements of 180° are the negatives of each other. Thus, the values of the in-phase component (I(i)) and quadrature component (Q(i)) of the signal are stored within SC memory 14, where i=1 . . . NT and NT represents the total number of correlations. Since the values, I and Q, are stored for each time subinterval, there would be a total of 20 values (ten values for I(i) and ten values for Q(i)) stored in SC memory 14 for the ten time subintervals shown in FIG. 3. SC memory 14 is preferably a fast acting memory buffer, such as random access memory (RAM), or the like.

If nine steps are taken by the signal, there would be ten time subintervals and 19,683 ($3^9$) different possible phase paths starting from the first time subinterval. This is because at each step, a subsequent step may follow only one of three phases: (1) does not change phase or remains at the same phase; (2) changes phase by +90°; or (3) changes phase by −90°. As such, sums over all possible phase paths are calculated where a phase path constitutes a piece-wise continuous path which at each time subinterval boundary either does not change phase or changes phase by ±90°. As can be seen in FIG. 3, there are four possible starting phase points for the first time subinterval as shown, namely 0°, ±90° and 180°. Therefore, there are 78,732 ($4 \times 3^9$) possible paths the correlations could take which would be represented by 78,732 sums. Note that all paths have a corresponding path displaced by 180° which is term by term identical in magnitude and opposite in sign, therefore requiring the calculation of only 39,366 sums (78,732/2). By proper choice of the time subinterval, the phase of the signal being detected will have moved continuously through a random phase path contained within the matrix of correlation paths and will be best approximated by one of the constructed piece-wise continuous correlation paths. Of all possible phase paths, the one which produces the maximum sum or maximum correlation is the best estimate of the actual phase path and its end point is the best estimate of the phase at that point in time. Along the optimum estimated phase path, the integration is coherent over the extended time intervals, in this instance, yielding a factor of ten in time, a factor of ten in processing gain, and a factor of ten in signal-to-noise (S/N) ratio.

Figure 4:
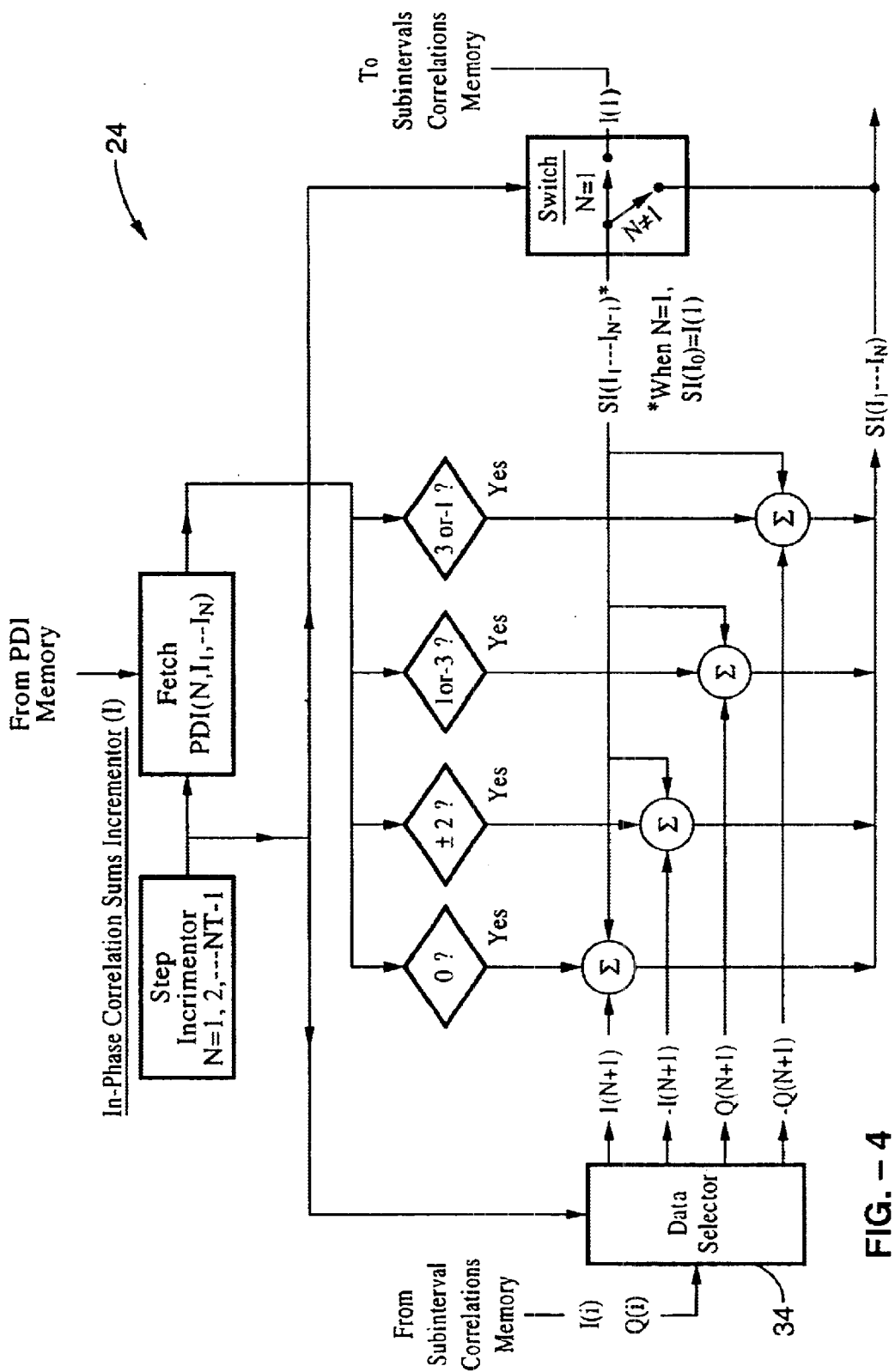
FIG. 4 is a functional flow diagram of an in-phase correlation sums incrementor shown in FIG. 1.

Referring now to FIG. 4 and FIG. 5, correlation sums incrementor 18 receives the in-phase correlation values I(i) and the quadrature correlation values Q(i) from subinterval correlation memory 14 for processing. These values respectively represent the in-phase and quadrature components of the signal for each time subinterval. Correlation sums incrementor 18 comprises an in-phase correlation sums incrementor 24, as shown in FIG. 4, and a quadrature correlation sums incrementor 26, as shown in FIG. 5.

In-phase correlation sums incrementor 24 receives the values for I(i) and Q(i) from SC memory 14 and forms an in-phase correlation signal sums (SI). The first term of the in-phase correlation sums is I(1), which represents the in-phase correlation value for the first time subinterval of the signal, and successive partial sums, represented by SI($I_1$ ... $I_N$), are generated by selecting and adding the appropriate ±I(N+1) or ±Q(N+1) to SI($I_1$ ... $I_{N-1}$) values, according to the value received from PDI memory 16, which contain indices that represent all possible phase paths for the transmitted signal. For each value of N, $2 \times 3^N$ additions are implemented. If the total number of time subintervals is NT, the maximum value of N is NT−1. Successive partial sums are determined by iteratively comparing the value received from PDI memory 16 to preset values to determine whether I(N+1), −I(N+1), Q(N+1) or −Q(N+1) is the N+1 term in the partial sum to be applied from a data selector 34. The conditions for determining the appropriate successive terms in the partial sums based on the preset values are as follows:

If PDI(N, $I_1$ ... $I_N$)=0, then I(N+1);

If PDI(N, $I_1$ ... $I_N$)=2 or (−2), then, the −I(N+1);

If PDI(N, $I_1$ ... $I_N$)=1 or −3, then Q(N+1); and

If PDI(N, $I_1$ ... $I_N$)=3 or −1, then −Q(N+1)

Quadrature correlation sums incrementor 26 also receives the values I(i) and Q(i) from SCM 14 and forms the quadrature correlation signal sums (SQ). The first term of the quadrature correlation is Q(1), which represents the quadrature correlation value for the first time subinterval, and successive partial sums, represented by SQ($I_1$ ... $I_N$), are generated by adding the appropriate ±I(N+1) or ±Q(N+1) to SQ ($I_1$ ... $I_{N-1}$) values, according to the value, received from PDI memory 16. Successive partial sums are determined by iteratively comparing the value received from PDI memory 16 to preset values to determine whether Q(N+1), −Q(N+1), I(N+1) or −I(N+1) is the N+1 term in the partial sum from data selector 34. The conditions for determining the appropriate successive partial sums are as follows:

If PDI(N, $I_1$ ... $I_N$)=0, then Q(N+1);

If PDI(N, $I_1$ ... $I_N$)=2 or (−2), then, the −Q(N+1);

If PDI(N, $I_1$ ... $I_N$)=1 or −3, then I(N+1); and

If PDI(N, $I_1$ ... $I_N$)=3 or −1, then −I(N+1)

In-phase correlation sums incrementor 24 and quadrature correlation sums incrementor 26 thereby perform the general functions of decision making and summing. Those skilled in the art will appreciate that in-phase correlation sums incrementor 24 and quadrature correlation sums incrementor 26 can be implemented in an electrical circuit or a plurality of interconnected logic circuits. Alternatively, decision making and summing steps performed by correlation sums incrementor 24 and quadrature correlation sums incrementor 26 can be implemented by a computer program of any programming language capable of being loaded into and run on a digital computer embodying the customary features, such as a microprocessor, RAM, ROM, memory storage and input/output devices. Alternatively, in-phase correlation sums incrementor 24 and quadrature correlation sums incrementor 26 may be implemented by coding a microprocessor or ASIC (Application Specific Integrated Circuit).

The following steps would generate the in-phase correlation sums over the phase path shown in FIG. 3:

| | |
|---|---|
| N = 1 PDI(1,2) = +1 | SI(2) = I(1) + Q(2) |
| N = 2 PDI(2,22) = +2 | SI(22) = SI(2) − I(3) |
| N = 3 PDI(3,220) = +1 | SI(220) = SI(22) + Q(4) |
| N = 4 PDI(4,2200) = 0 | SI(2200) = SI(220) + I(5) |
| N = 5 PDI(5,22001) = 0 | SI(22001) = SI(2200) + I(6) |
| N = 6 PDI(6,220010) = −1 | SI(220010) = SI(22001) − Q(7) |
| N = 7 PDI(7,2200100) = −2 | SI(2200100) = SI(220010) − I(8) |
| N = 8 PDI(8,22001000) = −3 | SI(22001000) = SI(2200100) + Q(9) |
| N = 9 PDI(9,220010002) = −2 | SI(220010002) = SI(22001000) − I(10) |

Resulting in an in-phase correlation sum:

$$SI(220010002)=I(1)+Q(2)-I(3)+Q(4)+I(5)+I(6)-Q(7)-I(8)+Q(9)-I(10)$$

The following steps would generate the quadrature correlation sums over the phase path in quadrature (displaced +90°) with the path shown in FIG. 3:

| | |
|---|---|
| N = 1 PDI(1,2) = +1 | SQ(2) = Q(1) + I(2) |
| N = 2 PDI(2,22) = +2 | SQ(22) = SQ(2) − Q(3) |
| N = 3 PDI(3,220) = +1 | SQ(220) = SQ(22) + I(4) |
| N = 4 PDI(4,2200) = 0 | SQ(2200) = SQ(220) + Q(5) |
| N = 5 PDI(5,22001) = 0 | SQ(22001) = SQ(2200) + Q(6) |
| N = 6 PDI(6,220010) = −1 | SQ(220010) = SQ(22001) − I(7) |
| N = 7 PDI(7,2200100) = −2 | SQ(2200100) = SQ(220010) − Q(8) |
| N = 8 PDI(8,22001000) = −3 | SQ(22001000) = SQ(2200100) + I(9) |
| N = 9 PDI(9,220010002) = −2 | SQ(220010002) = SQ(22001000) − Q(10) |

Resulting in a quadrature correlation sum:

$$SQ(220010002)=Q(1)+I(2)-Q(3)+I(4)+Q(5)+Q(6)-I(7)-Q(8)+I(9)-Q(10)$$

These sums represent the extended interval correlations over two particular phase paths, starting at zero phase and beginning with the term I(1) and starting at +90° and beginning with the term Q(1), which are in-quadrature (displaced by 90° over the entire path. The sums over all the other paths starting at 0° and +90° phase are generated and stored, comprising 39,366 numbers.

Figure 6B:
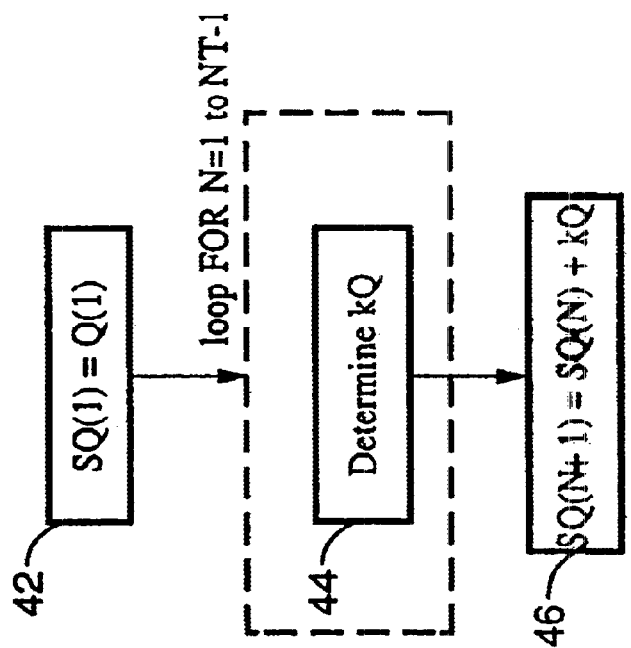
FIG. 6A and FIG. 6B are a flowcharts for both the in-phase and quadrature correlation sums incrementor, respectively, shown in FIG. 1.
Figure 6A:
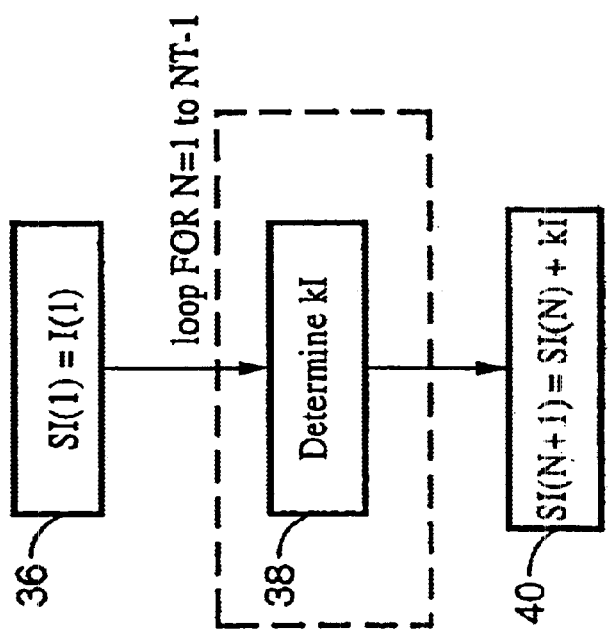

Referring also to FIG. 6A and FIG. 6B, flowcharts for the in-phase correlation sums incrementor 24 and quadrature correlation sums incrementor 26, respectively, as generally shown. As can be seen in FIG. 6A, the in-phase correlation sum (SI) is initially set equal to the in-phase correlation value for the first time subinterval of the signal I(1) 36. Next, the appropriate (N+1) term is determined 38, wherein k=(N+1) term. The (N+1) term is then added to the in-phase correlation sum (SI) 40. This process is repeated for the total number of steps (NT−1) taken by the signal. Similarly, as can be seen in FIG. 6B, the quadrature correlation sum (SQ) is initially set equal to the quadrature correlation value for the first time subinterval of the signal Q(1) 42. Next, the appropriate (N+1) term is determined 44, wherein k=(N+1) term. The (N+1) term is then added to the quadrature correlation sum (SQ) 46. This process is repeated for the total number of steps (NT−1) taken by the signal. The (N+1) term represents the successive in-phase or quadrature correlated signal values received from SC memory 14.

Figure 7:
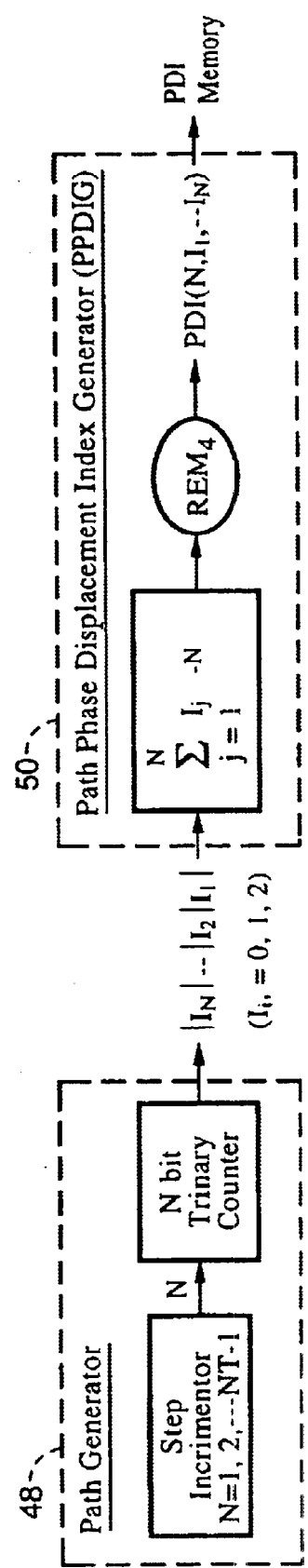
FIG. 7 is a functional block diagram for a path generator and a path phase displacement index generator shown in FIG. 1.

Referring also to FIG. 7, means 22 for generating phase path indices comprises a path generator 48 and a path phase displacement index generator (PPDIG) 50. Path generator generates $3^{NT-1}$ unique phase paths by creating a ternary word of length N where N is the number of transition steps that have occurred and the ternary bits (0,1,2) correspond to (−90°, 0°, +90°) phase changes, respectively. For example, if N=2 there have been two transitions, from the first time subinterval to the second time subinterval, and from the second time subinterval to the third time subinterval. If the ternary word is {2,0}, the phase is first shifted by +90° then by −90°, ending up where it started during the third time subinterval. In the phase path shown in FIG. 3, where there are nine phase steps (N=9) and ten time subintervals (NT=N+=10), the phase starts at a phase of 0° and ends at a phase of (−180°) and is represented by the 9-bit word {220010002}.

The first operation of PPDIG 50 is to sum the digits in the ternary word of length N and subtract N. Note that if the ternary word representing the phase path shown in FIG. 3 are summed (2+2+0+0+1+0+0+0+2=7) and N (9) subtracted from displacement of the phase path at the Nth step measured in 90° increments (7−9=−2, which corresponds to a phase displacement of −180°). The second operation of PPDIG 50 is to divide by four and take the remainder, always yielding one of the following: −3, −2, −1, 0, 1, 2, 3 (an integer between −3 and 3, inclusive). The indices which represent all possible phase paths are stored in PDI memory 16.

The indices stored in PDI memory 16 are dependent only on the total number of time subintervals (NT) and can be preferably generated off-line and stored into PDI memory 16, which is typically a read-only memory (ROM), or the like. Alternatively, the phase path indices can be generated every time a signal is correlated. The minimum memory capacity of PDI memory 16 is determined by the value of NT. For example, if NT=10, there are 29,524 indices requiring only 3 binary bits each for a total memory requirement of 88,572 bits (approximately 11 kilobytes). If NT=15, there are 7,174,453 indices which requires approximately 2.7 megabytes.

Those skilled in the art will appreciate that path generator 48 and PPDIG 50 can be implemented in an electrical circuit or a plurality of interconnected logic circuits. Alternatively, the ternary word generation, summation and division may be implemented by a computer program of any programming language capable of being loaded into and run on a digital computer. Alternatively, path generator 48 and PPDIG 50 may be implemented by coding a microprocessor or ASIC.

Phase path estimator 20 estimates the true phase path of the signal by determining the correlation sums having the maximum absolute value. Since the maximum correlation provides the best estimate of the true phase path of the signal over the extended time subinterval, the ternary word of the correlated sum having the maximum absolute value is the best estimate of the phase displacement path of the signal over the time subintervals. The best estimate of the starting phase point is calculated using the following formulas:

| Initial Phase = arcsin $(SQ/(SI^2 + SQ^2)^{1/2})$ | SI > 0 |
| Initial Phase = $\pi$ − arcsin $(SQ/(SI^2 + SQ^2)^{1/2})$ | SI < 0 | wherein SI and SQ are the sums over the best estimate path. The ending phase is determined using the following formula:

Final Phase=Initial Phase+$(\pi/2) \times PDI(N_T-1$, best estimate path)

Those skilled in the art will appreciate that phase path estimator 20 can also be implemented in an electrical circuit or a plurality of interconnected circuits. The steps performed by phase path estimator 20 may be performed by a computer program of any language capable of being loaded into and run on a digital computer. Alternatively, phase path estimator 20 may be implemented by coding a microprocessor or ASIC.

Accordingly, it will be seen that this invention extends the effective coherent integration time of a signal by correlating the signal over subintervals of time both in-phase and in quadrature, summing the correlated signals based on indices which represent all possible paths of the signal phase and estimating the true phase path of the signal by determining the correlation sum having the maximum absolute value. Although the description above contains many specificities, these should not be construed as limiting the scope of the invention but as merely providing illustrations of some of the presently preferred method and embodiment of this invention. Thus the scope of this invention should be determined by the appended claims and their legal equivalents.

What is claimed is:

1. A method for detecting and tracking a coded signal that is correlated in-phase and quadrature over subintervals of time, wherein an in-phase signal component value of the signal is derived and a quadrature signal component value of the signal is derived for each time subinterval, comprising the steps of:

(a) retrieving from a memory stored data (PDI) representing path phase displacement indices;

(b) forming in-phase correlation sums (SI) of the in-phase signal component values, wherein each in-phase correlation sum has as its first term the in-phase signal component value from a first time subinterval and successive partial sums are determined by iteratively comparing the retrieved data to a preset condition and applying an appropriate in-phase or quadrature signal component value;

(c) forming quadrature correlation sums (SQ) of the quadrature signal component values, wherein each quadrature correlation sum has as its first term the quadrature signal component value from the first time subinterval and successive partial sums are determined by iteratively comparing the retrieved data to the preset condition and applying an appropriate in-phase or quadrature signal component value; and (d) estimating a true path of the signal by determining the correlation sums, in-phase or quadrature, having a maximum absolute value, wherein the estimate of the true path of the signal includes an ending phase.

2. The method as recited in claim 1, wherein said preset condition comprises an integer between (−3) and 3, inclusive.

3. The method as recited in claim 2, wherein if said preset condition equals zero, the in-phase component signal value from a subsequent time subinterval is added to the in-phase correlation sums and the quadrature component signal value from the subsequent time subinterval is added to the quadrature correlation sums.

4. The method as recited in claim 2, wherein if said preset condition equals (−2) or 2, an additive inverse of the in-phase component signal value from a subsequent time subinterval is added to the in-phase correlation sums and an additive inverse of the quadrature component signal value from the subsequent time subinterval is added to the quadrature correlation sums.

5. The method as recited in claim 2, wherein if said preset condition equals (−3) or 1, the quadrature component signal value from a subsequent time subinterval is added to the in-phase correlation sums and the in-phase component signal value from the subsequent time subinterval is added to the quadrature correlation sums.

6. The method as recited in claim 2, wherein if said preset condition equals (−1) or 3, an additive inverse of the quadrature component signal value from a subsequent time subinterval is added to the in-phase correlation sums and an additive inverse of the in-phase component signal value from the subsequent time subinterval is added to the quadrature correlation sums.

7. The method as recited in claim 1, further comprising the steps of:
(a) generating the PDI;
(b) storing the PDI in said memory.

8. The method as recited in claim 1, wherein the step of estimating the true path of the signal, further comprises determining a best estimate of an initial phase (IP) of the signal, using the formula: $\arcsin(SQ1/(SI1^2+SQ1^2)^{1/2})$ when SI1 is greater than zero, wherein SI1 and SQ1 are the in-phase and quadrature correlation sums over the true path.

9. The method as recited in claim 1, wherein the ending phase of the signal is determined by the formula: $IP+(\pi/2)\times PDI1$, where IP is an initial phase of the signal, and PDI1 is the PDI from a last time subinterval of the true path.

10. The method as recited in claim 1, wherein the step of estimating the true path of the signal, further comprises determining a best estimate of an initial phase (IP) of the signal, using the formula: $\pi-\arcsin(SQ1/(SI1+SQ1^2)^{1/2})$ when SI1 is less than zero, wherein SI1 and SQ1 are the in-phase and quadrature correlation sums over the true path.

11. An apparatus for detecting and tracking a coded signal within a noisy background environment, comprising:
(a) correlator means for correlating a signal over subintervals of time, wherein the signal is correlated in-phase and assigned an in-phase correlated signal value for each time subinterval and correlated in quadrature and assigned a quadrature correlated signal value for each time subinterval;
(b) first memory means for storing the in-phase correlated signal values and the quadrature correlated signal values from said correlator means, said first memory means coupled to said correlator means;
(c) second memory means for storing path phase displacement indices (PDI), wherein path phase displacement indices represent all possible phase paths for the signal;
(d) correlation sums incrementor means for forming in-phase correlation sums (SI) and quadrature correlation sums (SQ), wherein the in-phase correlation sums are formed by adding the in-phase correlated signal value from a first time subinterval and subsequent in-phase or quadrature correlated signal values determined by iteratively comparing a PDI retrieved data from said second memory, wherein the quadrature correlation sums are formed by adding the quadrature correlated signal value from the first time subinterval and subsequent in-phase or quadrature correlated signal values determined by iteratively comparing the PDI retrieved data from said second memory, said correlation sums incrementor means coupled to said first memory means and said second memory means; and
(e) estimating means for determining a true phase path of the signal, said estimating means coupled to said correlation sums incrementor means and said second memory means.

12. An apparatus as recited in claim 11, wherein said correlation sums incrementor means further comprises an in-phase correlation sums incrementor and a quadrature correlation sums incrementor.

13. An apparatus as recited in claim 11, further comprising a means for generating PDI.

14. An apparatus as recited in claim 13, wherein said means for generating PDI further comprises:
(a) a phase path generator; and
(b) a path phase displacement index generator, said path phase displacement index generator coupled to said phase path generator and said second memory means.

15. An apparatus as recited in claim 11, wherein said correlator means comprises:
(a) an antenna for receiving the coded signal;
(b) a preamp assembly coupled to said antenna, said preamp assembly including a signal output;
(c) means for mixing the signal output from the preamp assembly with a first locally generated signal and a second locally generated signal which is displaced 90° in phase from the first locally generated signal, thereby resulting in an in-phase signal and a quadrature signal from said signal output;
(d) a first low pass filter which receives said in-phase signal and a second low pass filter which receives said quadrature signal;
(e) a first A/D convertor coupled to said first low pass filter and a second A/D convertor coupled to said second low pass filter; and
(f) an in-phase signal correlator coupled to said first A/D convertor and a quadrature signal correlator coupled to said second A/D convertor.

16. A method for detecting and tracking a coded signal within a noisy background environment, comprising the steps of:
(a) correlating a signal over subintervals of time, wherein the signal is correlated in-phase and assigned an in-phase correlated signal value for each time subinterval and correlated in quadrature and assigned a quadrature correlated signal value for each time subinterval;
(b) storing in-phase correlated signal values and quadrature correlated signal values into a first memory;
(c) retrieving stored data representing path phase displacement indices (PDI) from a second memory;
(d) forming in-phase correlation sums (SI) of the in-phase correlated signal values, wherein each in-phase correlation sum has as its first term the in-phase correlated signal value from a first time subinterval and successive partial sums are determined by iteratively comparing the retrieved PDI from said second memory and applying an appropriate in-phase or quadrature correlated signal value from said first memory;

(e) forming quadrature correlation sums (SQ) of the quadrature correlated signal values, wherein each quadrature correlation sum has as its first term the quadrature correlated signal value from the first time subinterval and successive partial sums are determined by iteratively comparing the retrieved PDI from said second memory and applying an appropriate in-phase or quadrature correlated signal value from said first memory; and (f) estimating the true phase path of the signal by determining the correlation sums, in-phase or quadrature, having a maximum absolute value, wherein the estimate of the true phase path of the signal includes an ending phase.

17. The method as recited in claim 16, wherein comparing the retrieved PDI from said second memory and applying the appropriate in-phase or quadrature correlated signal value from said first memory during the step of forming the in-phase correlation sums, further comprises the steps of:

(a) determining the value of the PDI retrieved from said second memory, wherein the PDI consists of an integer between (−3) to 3, inclusive;

(b) adding the in-phase correlated signal value from a subsequent time subinterval as a subsequent partial sum, if the value of the PDI retrieved from said second memory equals zero;

(c) adding an additive inverse of the in-phase correlated signal value from the subsequent time subinterval as the subsequent partial sum, if the value of the PDI retrieved from said second memory equals 2 or (−2);

(d) adding the quadrature correlated signal value from the subsequent time subinterval signal value as the subsequent partial sum, if the value of the PDI retrieved from said second memory equals 1 or (−3); and (e) adding an additive inverse of the quadrature correlated signal value from the subsequent time subinterval as the subsequent partial sum, if the value of the PDI retrieved from said second memory equals (−1) or 3.

18. The method as recited in claim 16, wherein comparing the retrieved PDI from said second memory and applying the appropriate in-phase or quadrature correlated signal value from said first memory during the step of forming the quadrature correlation sums, further comprises the steps of:

(a) determining the value of the PDI retrieved from said second memory, wherein the PDI may consist of an integer between (−3) to 3, inclusive;

(b) adding the quadrature correlated signal value from a subsequent time subinterval as a subsequent partial sum, if the value of the PDI retrieved from said second memory equals zero;

(c) adding an additive inverse of the quadrature correlated signal value from the subsequent time subinterval as the subsequent partial sum, if the value of the PDI retrieved from said second memory equals 2 or (−2);

(d) adding the in-phase correlated signal value from the subsequent time subinterval as the subsequent partial sum, if the value of the PDI retrieved from said second memory equals 1 or (−3); and (e) adding an additive inverse of the in-phase correlated signal value from the subsequent time subinterval as the subsequent partial sum, if the value of the PDI retrieved from said second memory equals (−1) or 3.

19. The method as recited in claim 16, wherein the step of estimating the true phase path of the signal, further comprises determining a best estimate of an initial phase (IP) of the signal, using the formula: $\arcsin(SQ1/(SI1^2+SQ^2)^{1/2})$ when SI1 is greater than zero, wherein SI1 and SQ1 are the in-phase and quadrature correlation sums over the true path.

20. The method as recited in claim 16, wherein the ending phase of the signal is determined by the formula: $IP+(\pi/2) \times PDI1$, where IP is an initial phase of the signal, and PDI1 is the PDI from a last time subinterval of the true path.

21. The method as recited in claim 16, wherein the step of estimating the true phase path of the signal, further comprises determining a best estimate of an initial phase (IP) of the signal, using the formula: $\pi - \arcsin(SQ1/(SI1^2+SQ^2)^{1/2})$ when SI1 is less than zero, wherein SI1 and SQ1 are the in-phase and quadrature correlation sums over the true path.

22. The method as recited in claim 16, further comprising the steps of:

(a) generating the PDI; and (b) storing the PDI into said second memory.

* * * * *